US010015623B2

(12) United States Patent
Thoen (10) Patent No.: US 10,015,623 B2
(45) Date of Patent: Jul. 3, 2018

(54) NFMI BASED ROBUSTNESS (71) Applicant: NXP B.V., Eindhoven (NL)

(72) Inventor: Steven Mark Thoen, Leuven (BE)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 15/185,929

(22) Filed: Jun. 17, 2016

(65) Prior Publication Data
US 2017/0366924 A1 Dec. 21, 2017

(51) Int. Cl.
H04W 24/00 (2009.01)
H04W 4/00 (2018.01)
H04L 1/24 (2006.01)
H04B 1/3827 (2015.01)
H04R 5/033 (2006.01)
H04W 4/80 (2018.01)
H04M 1/725 (2006.01)
H04N 7/14 (2006.01)
H04W 4/02 (2018.01)

(52) U.S. Cl.
CPC ............ H04W 4/008 (2013.01); H04B 1/385 (2013.01); H04L 1/245 (2013.01); H04M 1/72519 (2013.01); H04M 1/72563 (2013.01); H04N 7/142 (2013.01); H04R 5/033 (2013.01); H04W 4/023 (2013.01); H04W 4/80 (2018.02); H04M 2250/12 (2013.01); H04M 2250/52 (2013.01); H04N 2007/145 (2013.01); H04R 2420/03 (2013.01); H04R 2420/05 (2013.01); H04R 2499/11 (2013.01)

(58) Field of Classification Search
CPC ........ H04W 4/008; H04R 5/033; H04L 1/245; H04B 1/385
USPC .......................................... 455/425; 370/338
See application file for complete search history.

(56) References Cited

U.S. PATENT DOCUMENTS

| 7,627,289 | B2 | 12/2009 | Huddart | |
|---|---|---|---|---|
| 8,768,252 | B2 | 7/2014 | Watson et al. | |
| 9,742,471 | B1 | 8/2017 | Thoen | |
| 2003/0100274 | A1* | 5/2003 | Brown | H04M 1/6066 455/90.1 |
| 2007/0149261 | A1* | 6/2007 | Huddart | H04R 5/033 455/575.2 |

(Continued)

FOREIGN PATENT DOCUMENTS

| CN | 203135874 | 8/2013 |
|---|---|---|
| WO | WO-2008/113053 | 9/2008 |
| WO | WO-2014/124100 A1 | 8/2014 |

OTHER PUBLICATIONS

Bragi Company; "Bragi"; 4 pages; retreived from the internet Aug. 2, 2017 at www.bragi.com.
Non Final Office Action; U.S. Appl. No. 15/667,352; 21 pages (dated Feb. 5, 2018).

(Continued)

Primary Examiner — Marcos Batista (57) ABSTRACT

One example discloses an apparatus for near-field magnetic induction (NFMI) based robustness, including: a first wireless device including a first wireless signal interface and a first NFMI signal interface; wherein the first wireless signal interface is configured to receive a data set from a third wireless device; wherein the first NFMI signal interface is configured to communicate with a second wireless device through a second NFMI signal interface; and wherein the first wireless device is configured to detect an error in the data set received from the third wireless device and in response to detecting the error configure the first NFMI signal interface to receive the data set from the second wireless device through the second NFMI signal interface.

13 Claims, 10 Drawing Sheets (56) References Cited

U.S. PATENT DOCUMENTS

| | | | |
|---|---|---|---|
| 2008/0076489 A1 | 3/2008 | Rosener et al. | |
| 2009/0154739 A1 | 6/2009 | Zellner | |
| 2012/0058727 A1 | 3/2012 | Cook et al. | |
| 2014/0010390 A1* | 1/2014 | Zhang | H04N 5/765 |
| | | | 381/309 |
| 2014/0219467 A1 | 8/2014 | Kurtz | |
| 2014/0376735 A1 | 12/2014 | Asrani et al. | |
| 2017/0111834 A1* | 4/2017 | Belverato | H04B 5/0006 |
| 2017/0171046 A1* | 6/2017 | Flood | H04B 1/385 |

OTHER PUBLICATIONS

Non Final Office Action for U.S. Appl. No. 15/667,352; 21 pages (dated Feb. 5, 2018).

Hunn, Nick; "The Market for Smart Wearable Technology—A Consumer Centric Approach"; retrieved from the Internet http://www.nickhunn.com/wp-content/uploads/downloads/2014/08/The-Market-for-Smart-Wearables.pdf on Jun. 13, 2016; 63 pages; (Feb. 2015).

NXP; "NXH2280UK: NFMI Radio for Wireless Audio and Data Streaming"; retrieved from the internet http://www.nxp.com/products/interface-and-connectivity/wireless-connectivity/nfmi-radio-solutions/nfmi-radio-for-wireless-audio-and-data-streaming:NXH2280UK; 2 pages.

U.S. Appl. No. 15/667,352, 39 pages, filed Aug. 2, 2017.

Bragi; "Wireless Smart Earphones"; retrieved from the Internet http://www.bragi.com/; 16 pages. (Jun. 17, 2016).

Final Office Action; U.S. Appl. No. 15/667,352; 16 pages (dated May 11, 2018).

\* cited by examiner

NFMI BASED ROBUSTNESS

The present specification relates to systems, methods, apparatuses, devices, articles of manufacture and instructions for NFMI based robustness.

SUMMARY

According to an example embodiment, an apparatus for near-field magnetic induction (NFMI) based robustness, comprising: a first wireless device including a first wireless signal interface and a first NFMI signal interface; wherein the first wireless signal interface is configured to receive a data set from a third wireless device; wherein the first NFMI signal interface is configured to communicate with a second wireless device through a second NFMI signal interface; and wherein the first wireless device is configured to detect an error in the data set received from the third wireless device and in response to detecting the error configure the first NFMI signal interface to receive the data set from the second wireless device through the second NFMI signal interface.

In another example embodiment, the first wireless signal interface is a primary interface for receiving the data set and the first NFMI signal interface is a backup interface for receiving the data set.

In another example embodiment, the data set that the first wireless signal interface is configured to receive is a complete set of data and the data set that the first NFMI signal interface is configured to receive is a first subset of the complete set of data.

In another example embodiment, the complete set of data includes stereo audio data having left audio data and right stereo data; and the first subset of data includes either the left audio data or the right stereo data.

In another example embodiment, the complete set of data includes voice data having mono-audio data and microphone data; and the first subset of data includes either the mono-audio data or the microphone data.

In another example embodiment, the first wireless device is configured to transmit a second subset of the complete data set over the first NFMI signal interface to the second wireless device.

In another example embodiment, the data set received at the first wireless signal interface and the first NFMI signal interface is a complete set of data.

In another example embodiment, the first wireless device is configured to not receive the data set from the second wireless device until the first wireless device requests transfer of the data set.

In another example embodiment, the transfer request includes at least one of: a switch roles of the first and second wireless devices request; or a set-up a new wireless connection with the third wireless device request.

In another example embodiment, further comprising the second wireless device; wherein the second wireless device is configured to receive the data set from the third wireless device through a second wireless signal interface.

In another example embodiment, the wireless signal interface includes at least one of: a Bluetooth Classic wireless interface, or a Bluetooth Low Energy wireless interface.

In another example embodiment, robustness includes at least one of: providing an alternate data set path; a network reconfiguration; network switching; signal retransmission; or signal diversity.

In another example embodiment, the data set is at least one of: media data; video playback data; audio (e.g. sound) playback data; sensor data; health status data; battery status; or device settings.

In another example embodiment, the error is at least one of: an error caused by body shadowing; the data set is no longer being received; the data set is degraded; the data set has a signal strength below a threshold value; the data set contains digital or analog errors; a corrupted data set error; an incomplete data set error; or an erratic data set error.

In another example embodiment, the first and second wireless devices are hearables; and the third wireless device is at least one of: a smartphone; or a wearable.

In another example embodiment, the wireless devices include at least one of: a microphone; a earbud; a hearable; a smartphone; a smartwatch; a wearable device; a tablet; or a computer.

According to an example embodiment, an article of manufacture including at least one non-transitory, tangible machine readable storage medium containing executable machine instructions for robustness, comprising: wherein the article includes, a first wireless device including a first wireless signal interface and a first NFMI signal interface; and wherein the instructions include, configuring the first wireless signal interface to receive a data set from a third wireless device; configuring the first NFMI signal interface to communicate with a second wireless device through a second NFMI signal interface; and configuring the first wireless signal to detect an error in the data set from the third wireless device and in response to detecting the error request that the second wireless device send the data set to the first NFMI signal interface from the second NFMI signal interface.

According to an example embodiment, a method for NFMI based robustness, comprising: receiving a data set at a first wireless device from a third wireless device through a wireless channel; communicating between the first wireless device and a second wireless device through an NFMI channel; and detecting an error in the data set that the first wireless device receives from the third wireless device; and requesting that the second wireless device send the data set to the first wireless device over the NFMI channel in response to detecting the error.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless devices, such as wireless earbuds (also known as Hearables), in various embodiments include embedded voice, sound and sensor capabilities. Such wireless devices can be designed to support playback of stereo sound from an external device such as a cellphone, making phone calls, responding to voice commands, detecting sound events, and so on.

Some example embodiments communicate with a smartphone or other devices, such as tablet, computers, etc., through Bluetooth Classic (BT) or through Bluetooth Low Energy (BLE), and communicate with each other using Near-Field Magnetic Induction (NFMI) signals that can pass through various structures, including the human body, and in the case of hearables, through the human head.

While the examples discussed below tend to focus on example embodiments which transmit and receive audio data, the teachings herein also apply to media data, video data, sensor data, medical data, battery status, device settings and other data.

Figure 1:
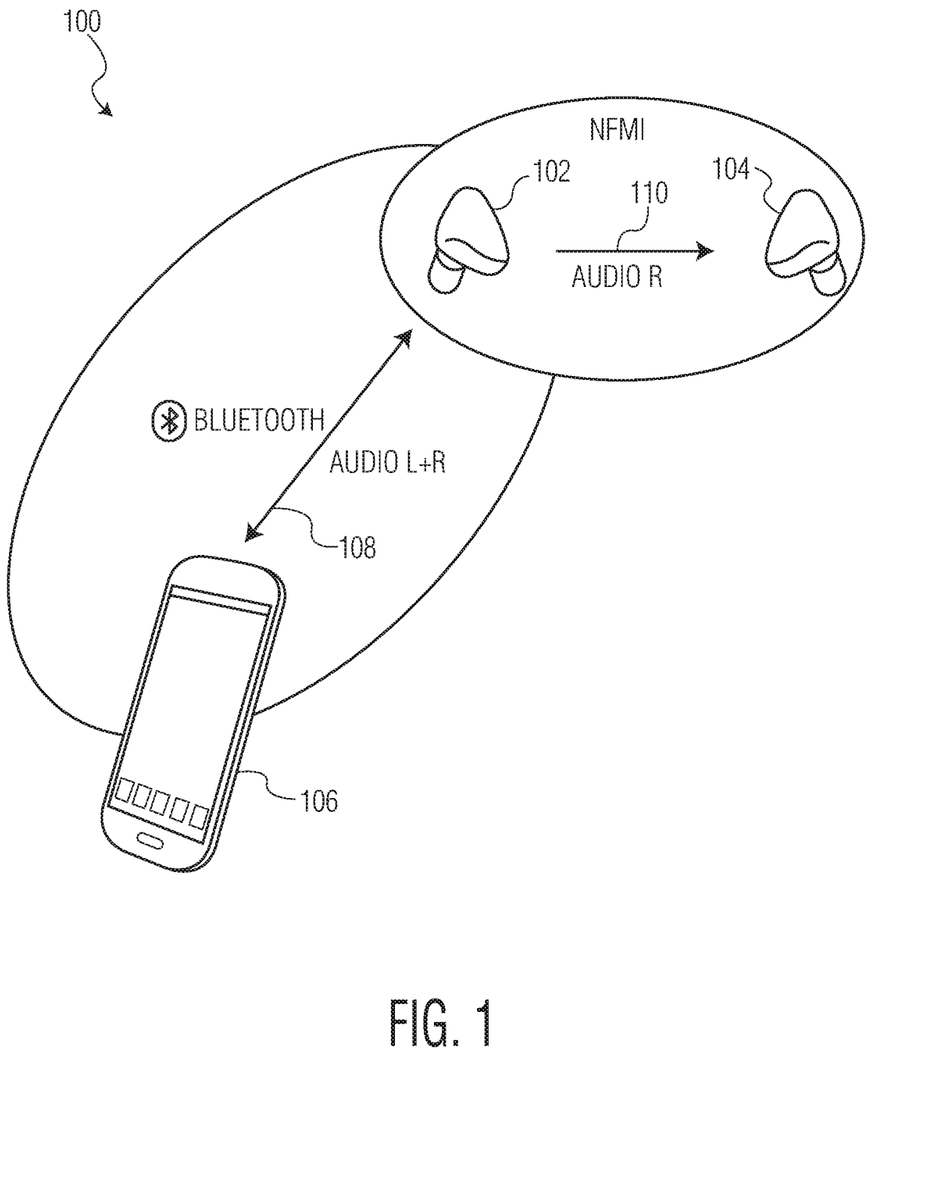
FIG. 1 depicts a first example protocol for communication between wireless devices.

FIG. 1 is a first example protocol 100 for communication between wireless devices. Shown in the first example 100 is a first wireless device 102 (e.g. left earbud), a second wireless device 104 (e.g. right earbud), a third wireless device 106 (e.g. smartphone), a received signal 108 (e.g. left and right audio signal), and a forwarded signal 110 (e.g. right only audio signal).

This first protocol 100 shows example exchanges left (L) and right (R) audio channels for media (e.g. audio, video, etc.) playback.

In this single-sided NFMI apparatus, the first wireless device 102 (e.g. left or perhaps called the master earbud) includes a data connection either through: a cloud network, a smartphone, or another device. The first wireless device 102 effects audio playback and communication using one or more input transducers (e.g. local microphones) and one or more output transducers (e.g. speakers).

In this first example 100, data (e.g. audio) is streamed to the wireless devices 102, 104 (e.g. earbuds). The data includes a complete (e.g. L and R stereo audio) signal which is sent to just one of the wireless devices 102 (i.e. the L earbud). Thus using Bluetooth Classic there is just a single audio source and a single audio sink.

In this example, Near-Field Magnetic Induction (NFMI) is used to transfer the forwarded signal 110 containing a relevant portion of the audio signal (e.g. just the R audio track) to the other wireless device 104 (e.g. R earbud). If a user is wearing the earbuds 102, 104, then the NFMI signal travels through and/or around the user's body thereby creating a full stereo audio experience at the earbuds 102, 104.

These wireless devices (e.g. smartphones, hearable earbuds, etc.) using the Bluetooth classic link (i.e. channel) only communicate with one other wireless device at a time. In some situations, however, this BT link can be blocked when the smartphone is worn close to a person's body. This is called a body shadowing effect. Such a shadowing effect occurs anytime the BT link is degraded or blocked in some way such that an acceptable BT link cannot be maintained.

For example, body shadowing can occur when the smartphone is worn in the right back pocket of a user's pants when trying to reach the left earbud. The body shadowing effect can be especially noticeable in outdoor situations where reflections and multipath propagation that might bolster the single link are absent. In this case, both earbuds will be unable to play any music.

FIGS. 2A, 2B, 2C, 2D depict a second example protocol 200 for NFMI based robustness between wireless devices using Bluetooth Classic (BT). Robustness is herein defined to include various protocols for providing an alternate data stream, including network reconfiguration, network switching, signal retransmission and/or signal diversity (e.g. use of multiple routes to transmit the same data simultaneously). This second protocol 200 also shows example exchanges for left (L) and right (R) audio channels for media playback.

Shown in the second example 200 is a first wireless device 202 (e.g. a left earbud), a second wireless device 204 (e.g. a right earbud), and a third wireless device 206 (e.g. a smartphone). The third wireless device 206 communicates with the first and second devices 202, 204 through a primary wireless channel 208 and a backup wireless channel 210. All the wireless devices 202, 204, 206 include a wireless signal interface to transmit and/or receive data over the wireless channels 208, 210.

The first and second wireless devices 202, 204 also communicate through an NFMI channel 212 (e.g. for ear-to-ear audio forwarding). The first and second wireless devices 202, 204 (e.g. the earbuds) both include an NFMI signal interface for exchanging data over the NFMI channel 212.

The wireless devices 202, 204 need not be the same in all example embodiments. In one example embodiment, the wireless devices 202, 204 are two earbuds configured to be worn by a person. In another example embodiment, the wireless devices 202, 204 are a smartwatch and a smartphone configured to be carried or worn by a person. In yet another example embodiment, the wireless devices are two or more devices positioned at locations such that the NFMI channel 212 is still reliably operable. The wireless devices 202, 204 thus could be: an earbud, a hearable, a smartphone, a smartwatch, a wearable device, a tablet, a computer, a wireless microphone, etc.

In some example embodiments, both wireless devices 202, 204 (e.g. earbuds) are substantially symmetric so that each can perform most, or perhaps all, of the NFMI and wireless communications functions of the other.

Figure 2A:
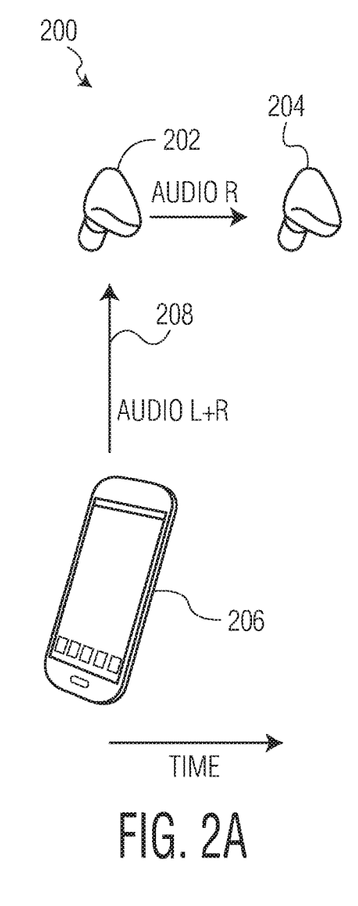
FIGS. 2A, 2B, 2C, 2D depict a second example protocol for NFMI based robustness between wireless devices.

FIG. 2A shows the third wireless device 206, using BT, over the primary wireless channel 208 to communicate data (e.g. a stereo audio playback signal) with the first wireless device 202. The first wireless device 202 then communicates relevant portions of the data (e.g. Right Channel of the stereo signal) to the second wireless device 204 over the NFMI channel 212.

Figure 2B:
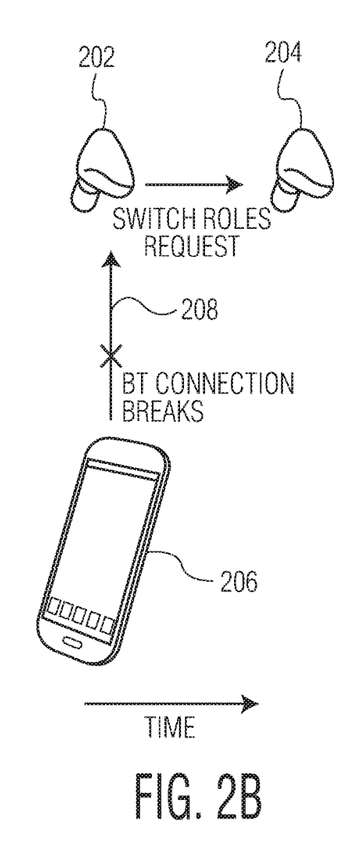

FIG. 2B shows an interruption in the primary wireless channel 208 (e.g. due to body shadowing) such that the data can no longer be communicated between the third wireless device 206 and the first wireless device 202. Recognizing this loss of data the first, second and third wireless devices 202, 204, 206 internally prepare and/or exchange signals (i.e. data) in preparation for reestablishing wireless data communication over the backup wireless channel 210.

There are many possible ways for the first, second and third wireless devices 202, 204, 206 to prepare, including: waiting for communications to be reestablished over the primary wireless channel 208 if the devices 202, 204, 206 have buffering capacity; exchanging signals and/or data over the NFMI channel 212 (e.g. switch roles request); or sending test signals over the primary and/or backup wireless channels 208, 210.

Figure 2C:
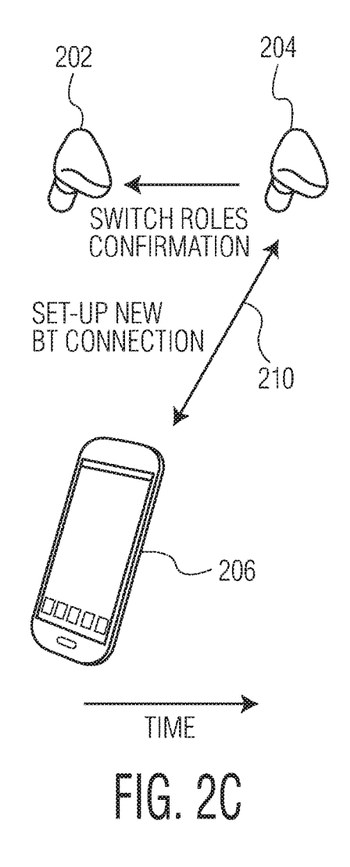

FIG. 2C shows the third wireless device 206, setting up a new BT connection over the backup wireless channel 210 to communicate the data (e.g. a stereo audio playback signal) with the second wireless device 204. In this example, an additional "switching roles confirmation" signal is also sent to the first wireless device 202.

Figure 2D:
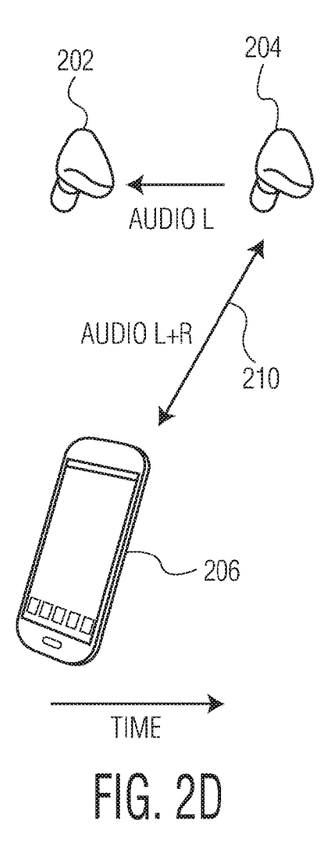

FIG. 2D shows that with the backup wireless channel 210 now in operation, the second wireless device 204 then communicates relevant portions of the data (e.g. Left Channel of the stereo signal) to the first wireless device 202 over the NFMI channel 212.

Thus by dynamically detecting wireless connection interruptions, such as caused by body shadowing, and having the earbuds switch roles, a user is under many circumstances capable of listening to the audio signal in stereo. Robustness of an overall hearables system increases since when the primary wireless channel 208 is blocked, there is a high likelihood that the backup wireless channel 210 can carry on with the data communication.

Figure 3:
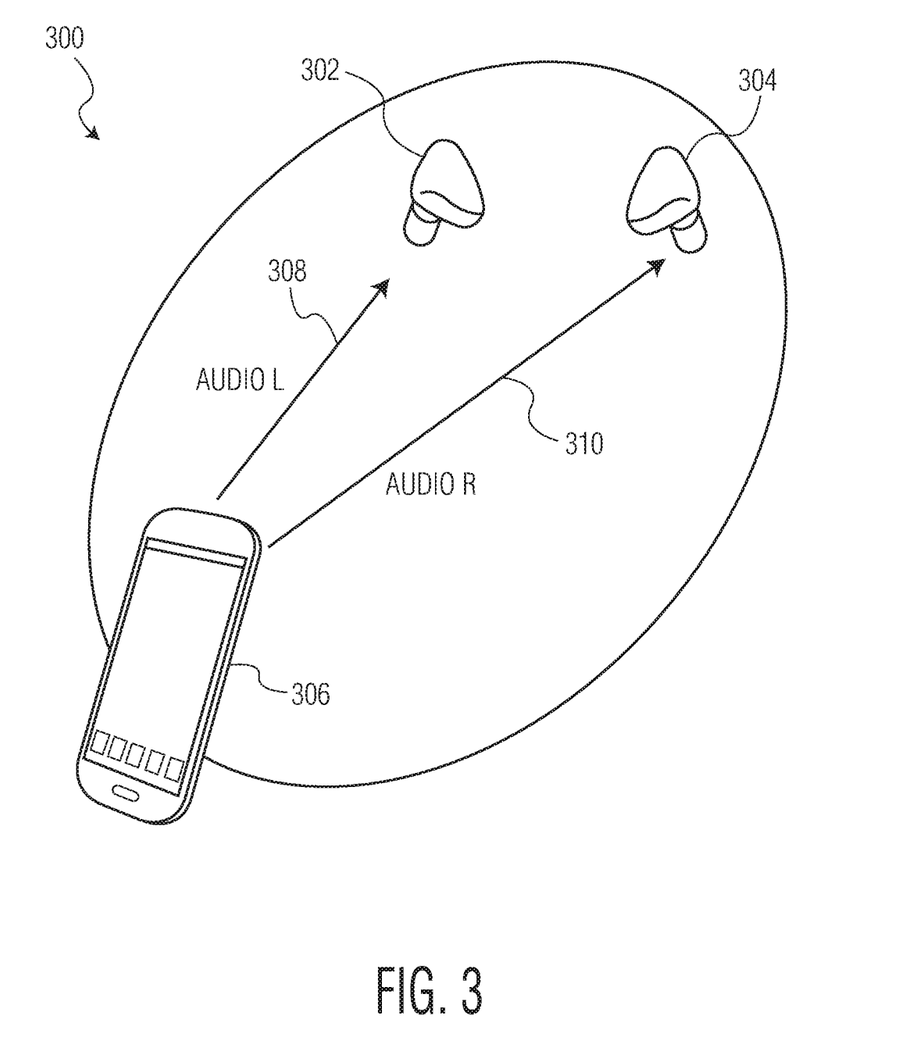
FIG. 3 depicts a third example protocol for communication between wireless devices.

FIG. 3 depicts a third example protocol 300 for communication between wireless devices, using Bluetooth Low Energy 5.1 (BLE). BLE 5.1 will allow a single audio source to stream audio to multiple audio sinks. This third protocol 300 shows example exchanges left (L) and right (R) audio channels for media playback.

Shown in the third example 300 is a first wireless device 302 (e.g. left earbud), a second wireless device 304 (e.g. right earbud), a third wireless device 306 (e.g. smartphone), a first received signal 308 (e.g. left only audio signal), and a second received signal 310 (e.g. right only audio signal).

In this third example 300, either a complete signal (e.g. stereo audio signal) or just relevant portions of the data (e.g. left and right audio tracks) can stream to multiple wireless devices 302, 304 (e.g. audio sinks). For an audio playback example, the third wireless device 306 (e.g. a smartphone) sets up separate L and R audio communications links with the earbuds 302, 304.

As shown in this audio playback use case, with separate L and R audio links 308, 310 set up to the respective earbuds 302, 304, BLE enables more intrinsic flexibility.

FIGS. 4A, 4B, 4C, 4D depict a fourth example protocol 400 for NFMI based robustness between wireless devices using Bluetooth Low Energy 5.1 (BLE). This fourth protocol 400 shows example exchanges left (L) and right (R) audio channels for media playback.

Shown in the fourth example 400 is a first wireless device 402 (e.g. a left earbud), a second wireless device 404 (e.g. a right earbud), and a third wireless device 406 (e.g. a smartphone). The third wireless device 406 communicates with the first and second devices 402, 404 through a first wireless channel 408 (e.g. audio L) and a second wireless channel 410 (e.g. audio R). All the wireless devices 402, 404, 406 include a wireless signal interface to transmit and/or receive data over the wireless channels 408, 410.

The first and second wireless devices 402, 404 also communicate through an NFMI channel 412 (e.g. for ear-to-ear audio forwarding). The first and second wireless devices 402, 404 (e.g. the earbuds) both include an NFMI signal interface for exchanging data over the NFMI channel 412.

Similar to as discussed in FIGS. 2A, 2B, 2C, 2D, the wireless devices 402, 404 need not be the same in all example embodiments. Also, in some example embodiments, both wireless devices 402, 404 (e.g. earbuds) are substantially symmetric so that each can perform most, or perhaps all, of the NFMI and wireless communications functions of the other.

Figure 4A:
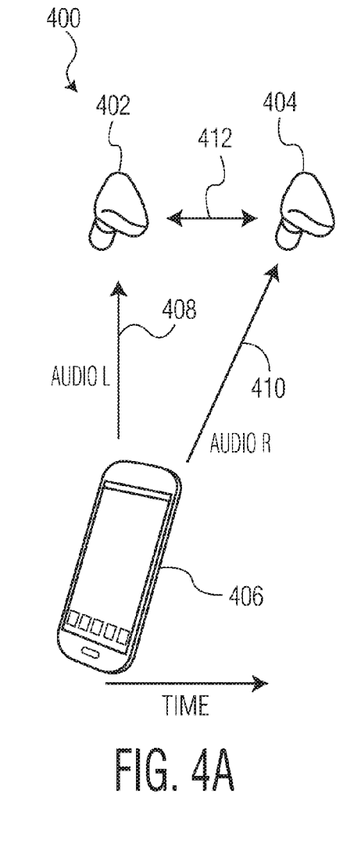
FIGS. 4A, 4B, 4C, 4D depict a fourth example protocol for NFMI based robustness between wireless devices.

FIG. 4A shows the third wireless device 406, using Bluetooth Low Energy 5.1 (BLE), over the first wireless channel 408 to communicate data (e.g. L stereo channel) with the first wireless device 402 and data (e.g. R stereo channel) to the second wireless device 404. The NFMI channel 412 in FIG. 4A is not used to exchange the L and R audio playback data.

Figure 4B:
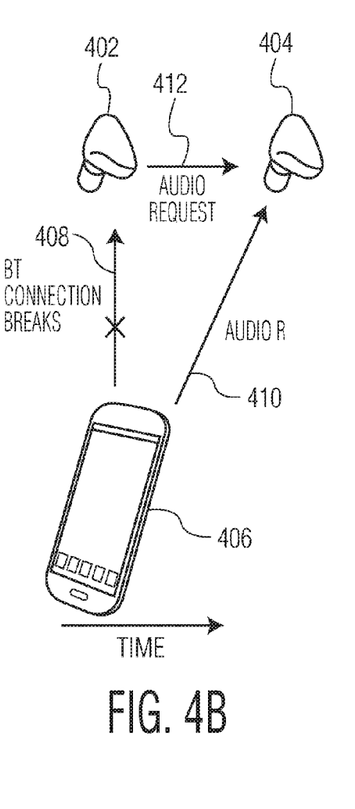

FIG. 4B shows an interruption (e.g. BLE connection breaks) in the first wireless channel 408 (e.g. perhaps due to body shadowing) such that the data can no longer be communicated between the third wireless device 406 and the first wireless device 402. Recognizing this loss of data the first, second and third wireless devices 402, 404, 406 internally prepare and/or exchange signals in preparation for communicating data the first wireless device's 402 data over the second wireless channel 410.

As introduced in FIGS. 2A, 2B, 2C, 2D, there are many possible ways for the first, second and third wireless devices 402, 404, 406 to prepare for this reconfiguration. FIG. 4B shows the first wireless device 402 sending an "audio request" to the second wireless device 404 over the NFMI channel 412.

Figure 4C:
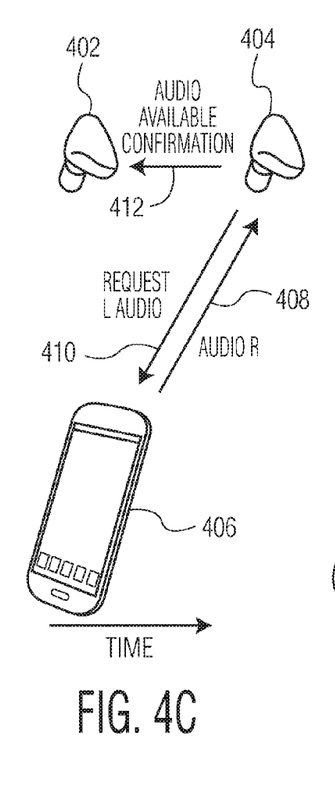

FIG. 4C shows the second wireless device 404 sending a "request L audio" to the third wireless device 406 (e.g. smartphone) over the second wireless channel 410 and an "audio available confirmation" to the first wireless device 402 over the NFMI channel 412.

Figure 4D:
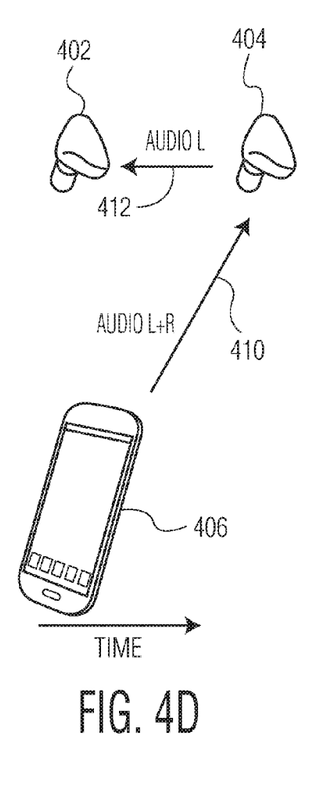

FIG. 4D shows the third wireless device 406 transmitting both sets of data (e.g. audio L+R) over the second wireless channel 410 to the second wireless device 404. With the second wireless channel 410 now receiving a complete set of stereo data, the second wireless device 404 then communicates relevant portions of the data (e.g. Left Channel of the stereo signal) to the first wireless device 402 over the NFMI channel 412.

Thus by dynamically detecting wireless connection interruptions, such as caused by body shadowing, and having the NFMI channel 412 between the first and second wireless devices 402, 404, a user is under many circumstances capable of listening to the audio signal in stereo. Robustness of an overall hearables system increased.

While setting up the new L audio routing does enable the first wireless device 402 (e.g. left earbud) to receive its data, this channel set up may take a user noticeable amount of time leading to a drop in audio playback quality, unless sufficient data buffering is added to each earbud 402, 404.

Figure 5A:
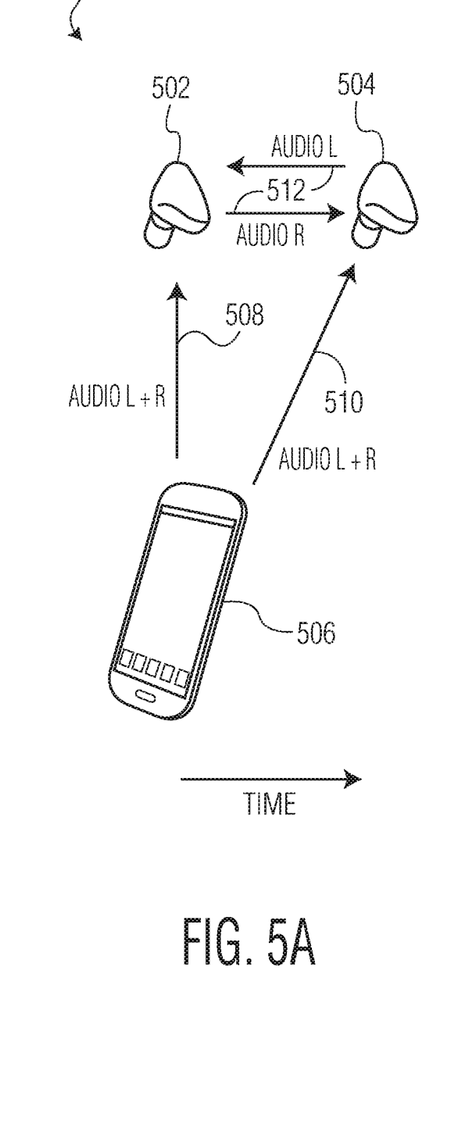
FIGS. 5A, 5B depict a fifth example protocol for NFMI based robustness between wireless devices.
Figure 5B:
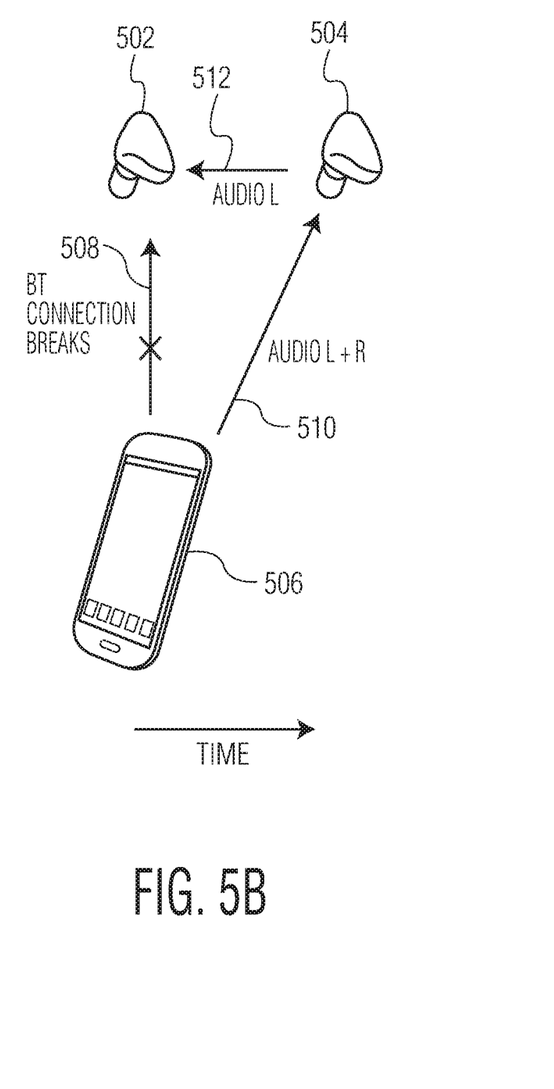

FIGS. 5A, 5B depict a fifth example protocol 500 for NFMI based robustness between wireless devices using BLE. This fifth protocol 500 also shows example exchanges left (L) and right (R) audio channels for media playback.

Shown in the fifth example 500 is a first wireless device 502 (e.g. a left earbud), a second wireless device 504 (e.g. a right earbud), and a third wireless device 506 (e.g. a smartphone). The third wireless device 506 communicates with the first and second devices 502, 504 through a first wireless channel 508 (e.g. audio L) and a second wireless channel 510 (e.g. audio R). All the wireless devices 502, 504, 506 include a wireless signal interface to transmit and/or receive data over the wireless channels 508, 510.

The first and second wireless devices 502, 504 also communicate through an NFMI channel 512 (e.g. for ear-to-ear audio exchange). The first and second wireless devices 502, 504 (e.g. the earbuds) both include an NFMI signal interface for exchanging data over the NFMI channel 512.

FIG. 5A shows the third wireless device 506, using BLE, over the first wireless channel 508 to communicate a complete set of data (e.g. both L and R stereo channels) with both the first wireless device 502 and the second wireless device 504. In one example embodiment, the NFMI channel 512 in FIG. 5A is not yet used to exchange either L or R audio playback data. In another example embodiment, the NFMI channel 512 in FIG. 5A is used to continuously exchange L and R audio playback data.

FIG. 5B shows an interruption (e.g. BLE connection breaks) in the first wireless channel 508 such that the data can no longer be communicated between the third wireless device 506 and the first wireless device 502. Recognizing this loss of data the first wireless device 502 immediately reconfigures to source its relevant data (e.g. the L audio channel) from the second wireless device 504 over the NFMI channel 512, instead of from the third wireless device 506 over the first wireless channel 508. In various examples the third wireless device 506 (e.g. smartphone) may or may not be aware of the interruption in the first wireless channel 508.

Thus by transmitting a complete set of data (e.g. both L and R stereo channels) to both the first wireless device 502 and the second wireless device 504 and continuously exchanging the L and R audio playback data over the NFMI channel 512, a user is under many circumstances capable of listening to the audio signal in stereo. Robustness of the overall hearables system is thus increased.

Since in this set of example embodiments, both of the wireless devices 502, 504 have dual sources for their required information, there is minimal latency in reconfiguring the devices 502, 504 and such reconfiguration is unlikely to be noticed by a user. This way, robustness is guaranteed with almost immediate switch-over such that audio drops can be avoided altogether.

Figure 6A:
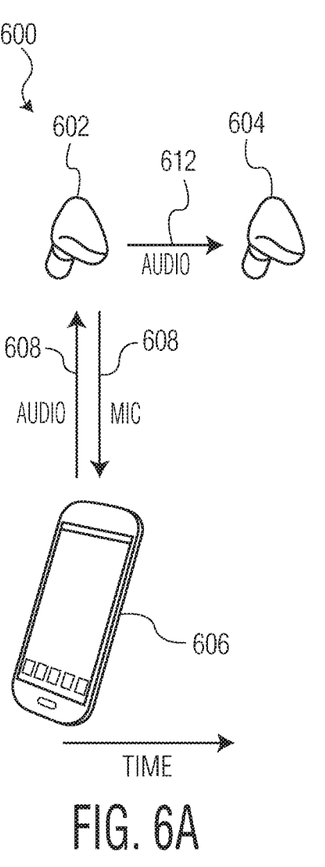
FIGS. 6A, 6B, 6C, 6D depict a sixth example protocol for NFMI based robustness between wireless devices.
Figure 6B:
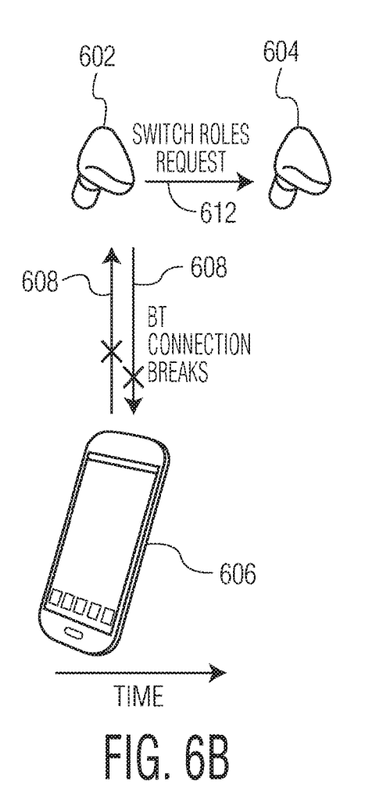
Figure 6C:
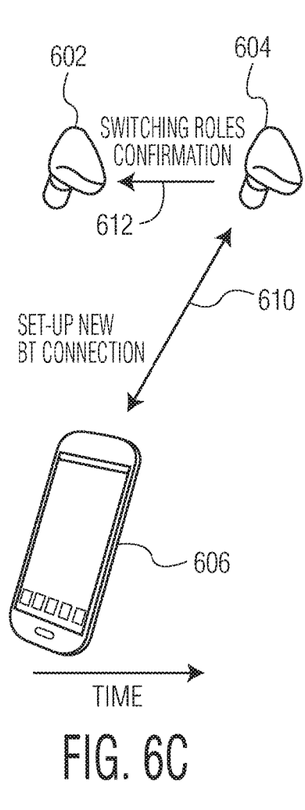
Figure 6D:
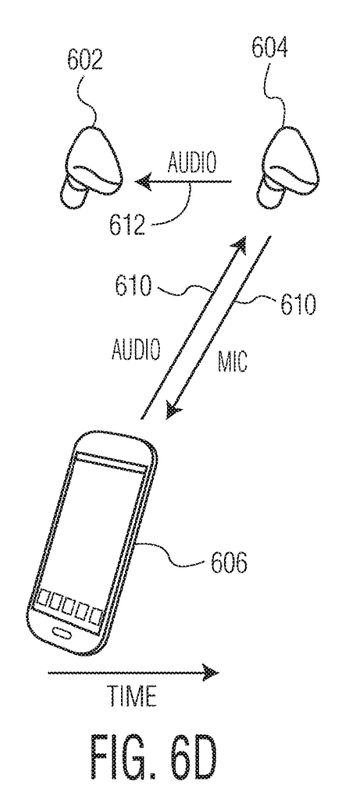
Figure 7A:
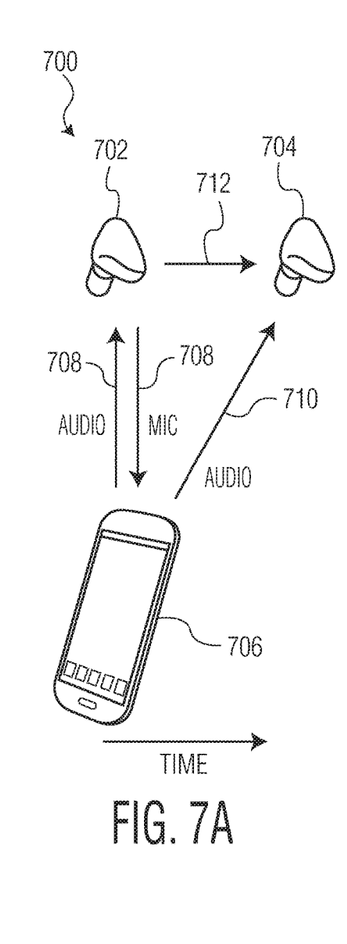
FIGS. 7A, 7B, 7C, 7D depict a seventh example protocol for NFMI based robustness between wireless devices.
Figure 7B:
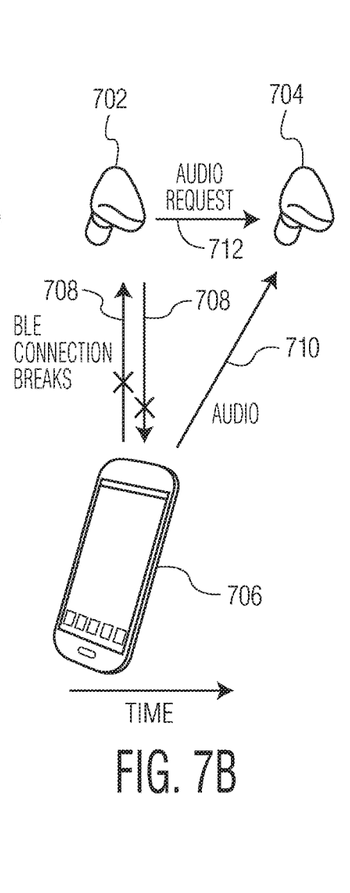
Figure 7C:
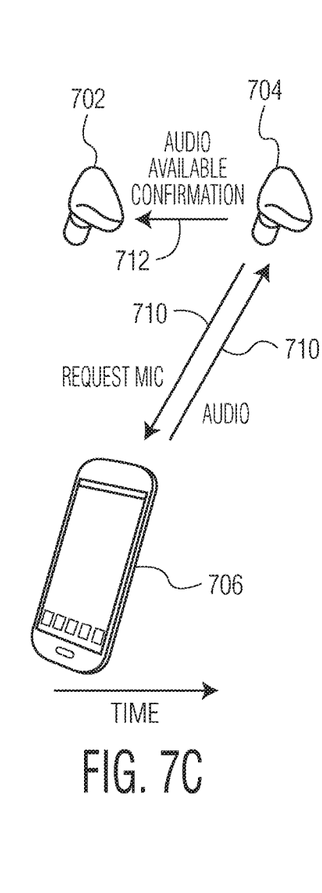
Figure 7D:
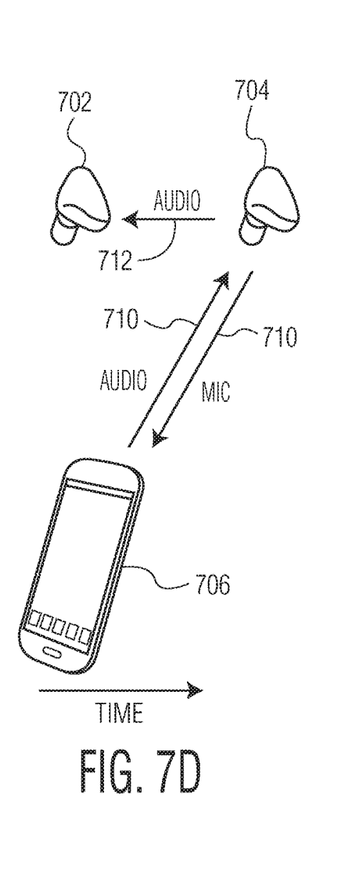
Figure 8A:
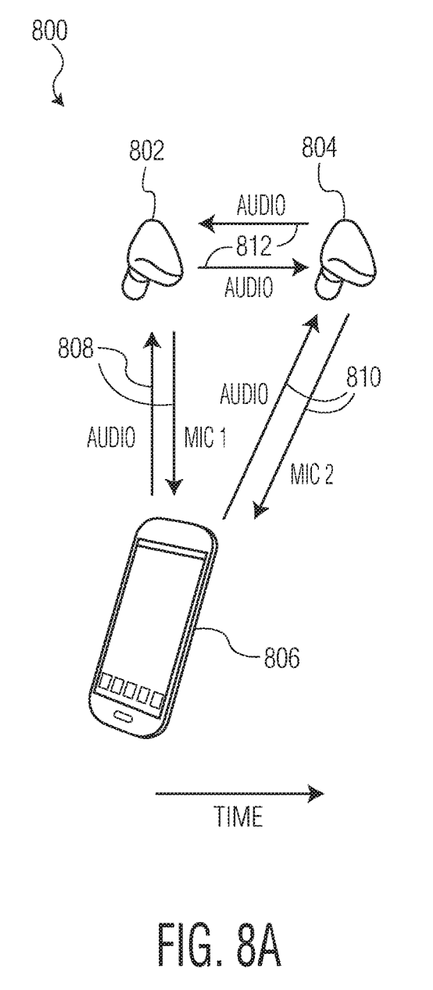
FIGS. 8A, 8B depict an eighth example protocol for NFMI based robustness between wireless devices.
Figure 8B:
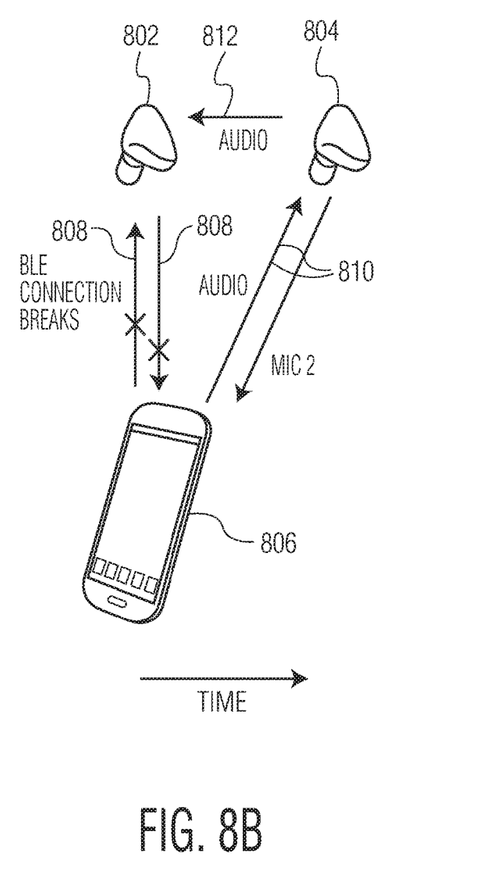

FIGS. 6, 7 and 8 extend the protocols introduced above for audio playback to other use cases such as two way data exchanges (e.g. audio and microphone), such as for voice calls, voice recognition, sound recording, and sensor or other data exchange.

FIGS. 6A, 6B, 6C, 6D depict a sixth example protocol 600 for NFMI based robustness between wireless devices using Bluetooth Classic (BT). This sixth protocol 600 shows example two way data exchanges (e.g. audio and microphone) for voice calls, voice recognition, sound recording, and data.

Shown in the sixth example 600 is a first wireless device 602 (e.g. a left earbud), a second wireless device 604 (e.g. a right earbud), and a third wireless device 606 (e.g. a smartphone). The third wireless device 606 communicates with the first and second devices 602, 604 through a primary wireless channel 608 and a backup wireless channel 610. All the wireless devices 602, 604, 606 include a wireless signal interface to transmit and/or receive data over the wireless channels 608, 610.

The first and second wireless devices 602, 604 also communicate through an NFMI channel 612 (e.g. for earbud-to-earbud audio and signal exchange). The first and second wireless devices 602, 604 (e.g. the earbuds) both include an NFMI signal interface for exchanging data over the NFMI channel 612.

FIG. 6A shows the third wireless device 606, using Bluetooth Classic (BT), over the primary wireless channel 608 to communicate data (e.g. a voice call with mono-audio and microphone signals) with the first wireless device 602. The first wireless device 602 then communicates relevant portions of the data (e.g. mono-audio signal) to the second wireless device 604 over the NFMI channel 612.

FIG. 6B shows an interruption in the primary wireless channel 608 (e.g. perhaps due to body shadowing) such that the data can no longer be communicated between the third wireless device 606 and the first wireless device 602. Recognizing this loss of data the first, second and third wireless devices 602, 604, 606 internally prepare and/or exchange signals in preparation for reestablishing wireless data communication over the backup wireless channel 610. In this example, an additional "switching roles request" signal is also sent from the first wireless device 602 to the second wireless device 604 over the NFMI channel 612.

FIG. 6C shows the third wireless device 606, setting up a new BT connection over the backup wireless channel 610 to communicate the data (e.g. a voice call with audio and microphone signals) with the second wireless device 604. In this example, an additional "switching roles confirmation" signal is also sent from the second wireless device 604 to the first wireless device 602 over the NFMI channel 612.

FIG. 6D shows that with the backup wireless channel 610 now in operation, the second wireless device 604 then communicates relevant portions of the data (e.g. mono-audio signal) to the first wireless device 602 over the NFMI channel 612.

FIGS. 7A, 7B, 7C, 7D depict a seventh example protocol 700 for NFMI based robustness between wireless devices using Bluetooth Low Energy 5.1 (BLE). This seventh protocol 700 also shows example two way data exchanges (e.g. mono-audio and microphone) for voice calls, voice recognition, sound recording, and data.

Shown in the seventh example 700 is a first wireless device 702 (e.g. a left earbud), a second wireless device 704 (e.g. a right earbud), and a third wireless device 706 (e.g. a smartphone). The third wireless device 706 communicates with the first and second devices 702, 704 through a first wireless channel 708 (e.g. mono-audio and microphone) and a second wireless channel 710 (e.g. mono-audio only). All the wireless devices 702, 704, 706 include a wireless signal interface to transmit and/or receive data over the wireless channels 708, 710.

The first and second wireless devices 702, 704 also communicate through an NFMI channel 712 (e.g. for earbud-to-earbud audio and signal exchange). The first and second wireless devices 702, 704 (e.g. the earbuds) both include an NFMI signal interface for exchanging data over the NFMI channel 712.

FIG. 7A shows the third wireless device 706, using Bluetooth Low Energy 5.1 (BLE), over the first wireless channel 708 to communicate data (e.g. mono-audio and microphone) with the first wireless device 702 and data (e.g. mono-audio only) to the second wireless device 704. The NFMI channel 712 in FIG. 7A is not yet used to exchange the voice call data.

FIG. 7B shows an interruption (e.g. BLE connection breaks) in the first wireless channel 708 such that the data can no longer be communicated between the third wireless device 706 and the first wireless device 702. Recognizing this loss of data the first, second and third wireless devices 702, 704, 706 internally prepare and/or exchange signals in preparation for communicating data the first wireless device's 702 data over the second wireless channel 710. In this example, the first wireless device 702 also sends an "audio request" to the second wireless device 704 over the NFMI channel 712.

FIG. 7C shows the second wireless device 704 sending a "request microphone" message to the third wireless device 706 (e.g. smartphone) over the second wireless channel 710 and an "audio available confirmation" to the first wireless device 702 over the NFMI channel 712. The "request microphone" message configures the second wireless device 704 to send either its own microphone signal, or the microphone signal from the first wireless device 702 received over the NFMI channel 712, to the third wireless device 706.

FIG. 7D shows the third wireless device 706 transmitting both sets of data (e.g. mono-audio and microphone) over the second wireless channel 710 to the second wireless device 704. With the second wireless channel 710 now exchanging a complete set of data, the second wireless device 704 then communicates relevant portions of the data (e.g. mono-audio) to the first wireless device 702 over the NFMI channel 712.

FIGS. 8A, 8B depict an eighth example protocol 800 for NFMI based robustness between wireless devices. This eighth protocol 800 also shows example two way data exchanges (e.g. mono-audio and microphone) for voice calls, voice recognition, sound recording, and data.

Shown in the eighth example 800 is a first wireless device 802 (e.g. a left earbud), a second wireless device 804 (e.g. a right earbud), and a third wireless device 806 (e.g. a smartphone). The third wireless device 806 communicates with the first and second devices 802, 804 through a first wireless channel 808 (e.g. mono-audio and first microphone) and a second wireless channel 810 (e.g. mono-audio and second microphone). All the wireless devices 802, 804, 806 include a wireless signal interface to transmit and/or receive data over the wireless channels 808, 810.

The first and second wireless devices 802, 804 also communicate through an NFMI channel 812 (e.g. for earbud-to-earbud mono-audio and signal exchange). The first and second wireless devices 802, 804 (e.g. the earbuds) both include an NFMI signal interface for exchanging data over the NFMI channel 812.

FIG. 8A shows the third wireless device 806, using BLE, over the first wireless channel 808 to communicate a complete set of data (e.g. both mono-audio and microphone signal) with both the first wireless device 802 and the second wireless device 804. In one example embodiment, the NFMI channel 812 in FIG. 8A is not yet used to exchange either the mono-audio or microphone data. In another example embodiment, the NFMI channel 812 in FIG. 8A is used to continuously exchange the mono-audio and microphone data.

FIG. 8B shows an interruption (e.g. BLE connection breaks) in the first wireless channel 808 such that the data can no longer be communicated between the third wireless device 806 and the first wireless device 802. Recognizing this loss of data the first wireless device 802 immediately reconfigures to source its relevant data (e.g. the mono-audio) from the second wireless device 804 over the NFMI channel 812, instead of from the third wireless device 806 over the first wireless channel 808. In various examples the third wireless device 806 (e.g. smartphone) may or may not be aware of the interruption in the first wireless channel 808.

Thus by transmitting a complete set of data (e.g. both mono-audio and microphone) to both the first wireless device 802 and the second wireless device 804 and continuously exchanging the mono-audio and microphone data over the NFMI channel 812, a user is under all circumstances capable of continuing the voice call and/or other data exchange. Robustness of the overall hearables system is thus increased.

Since in this set of example embodiments, both of the wireless devices 802, 804 have dual sources for their required information, there is minimal latency in reconfiguring the devices 802, 804 and such reconfiguration is unlikely to be noticed by a user. This way, robustness is guaranteed with almost immediate switch-over such that audio drops can be avoided altogether.

Thus as discussed above, the near-field magnetic induction (NFMI) channel enables multiple wireless devices (e.g. both earbuds) to communicate reliably with each other, thereby substantially improving an overall communications robustness. NFMI enables data (e.g. audio) transfer even when there is various degrees of body shadowing. The low latency and ultra-low power aspects of NFMI further enhance a user's experience.

Figure 9:
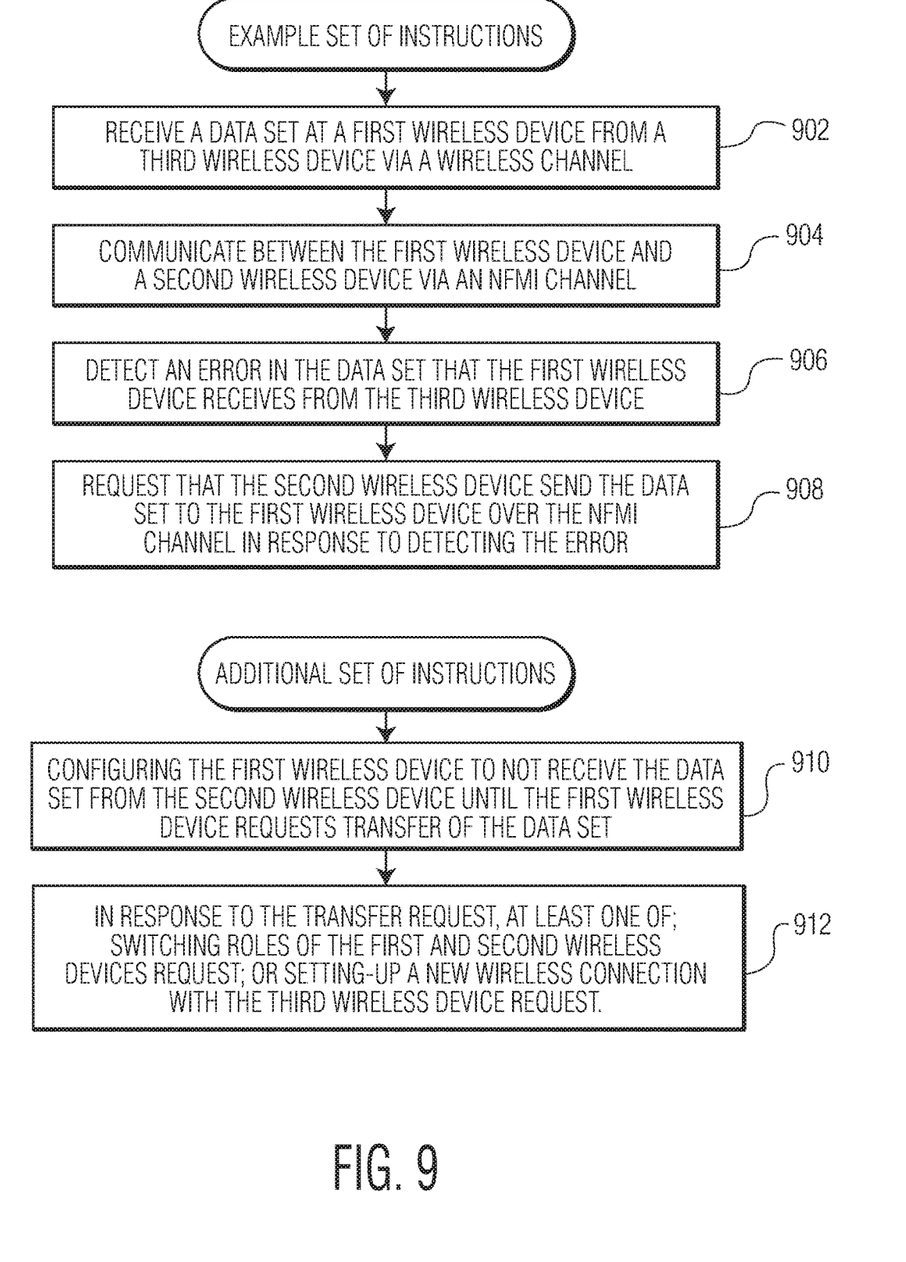
FIG. 9 is an example set of instructions for enabling NFMI based robustness between wireless devices.

FIG. 9 is an example set of instructions for enabling NFMI based robustness between wireless devices. The order in which the instructions are discussed does not limit the order in which other example embodiments implement the instructions unless otherwise specifically stated. Additionally, in some embodiments the instructions are implemented concurrently.

A first example instruction set begins in 902, by receiving a data set at a first wireless device from a third wireless device through a wireless channel. In 904, communicating between the first wireless device and a second wireless device through an NFMI channel. Then in 906, detecting an error in the data set that the first wireless device receives from the third wireless device. And in 908, requesting that the second wireless device send the data set to the first wireless device over the NFMI channel in response to detecting the error.

The instructions can be augmented or replaced with one or more of the following additional instructions, presented in no particular order: 910—Configuring the first wireless device to not receive the data set from the second wireless device until the first wireless device requests transfer of the data set. 912—In response to the transfer request, at least one of: switching roles of the first and second wireless devices request; or setting-up a new wireless connection with the third wireless device request.

Note that the instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

Figure 10:
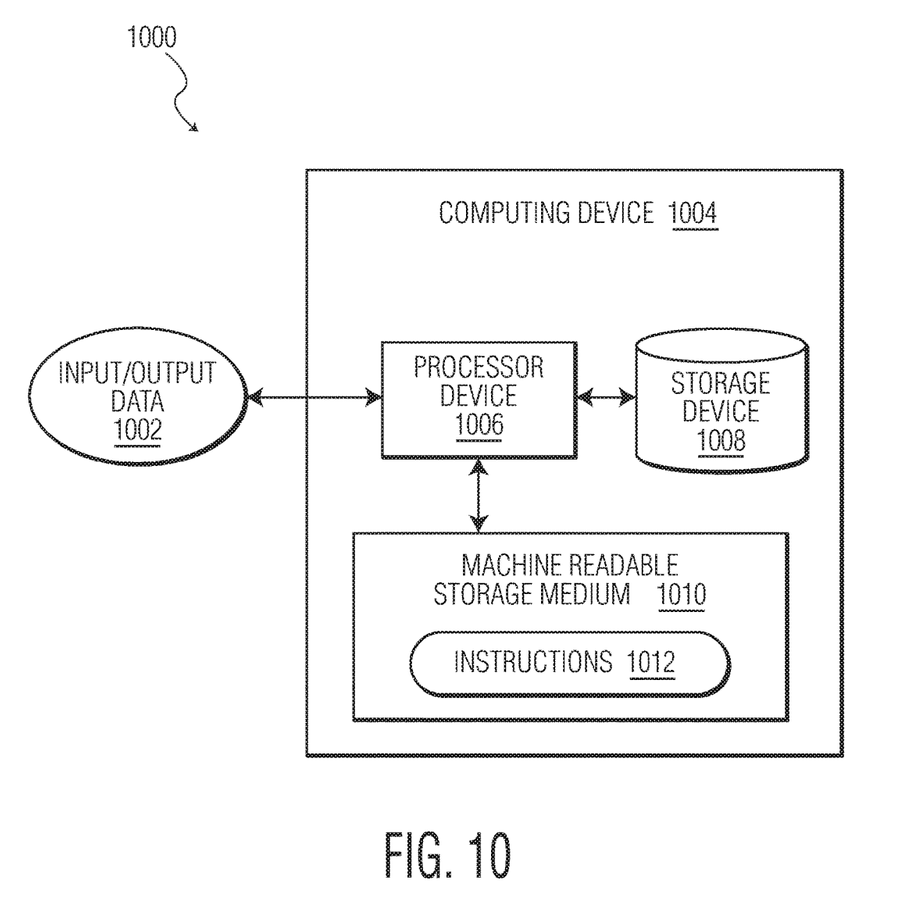
FIG. 10 is an example system for effecting one or more protocols for NFMI based robustness between wireless devices.

FIG. 10 is an example system 1000 for effecting one or more protocols for NFMI based robustness between wireless devices. The system 1000 shows an input/output data 1002 interface with an electronic apparatus 1004. The electronic apparatus 1004 includes a processor 1006, a storage device 1008, and a non-transient machine-readable storage medium 1010. The machine-readable storage medium 1010 includes instructions 1012 which control how the processor 1006 receives input data 1002 and transforms the input data into output data 1002, using data within the storage device 1008. Example instructions 1012 stored in the machine-readable storage medium 1010 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An apparatus for near-field magnetic induction (NFMI) based robustness, comprising:
    a first wireless device including a first wireless signal interface and a first NFMI signal interface, wherein the first wireless signal interface is configured to receive a complete data set from a third wireless device, the first NFMI signal interface is configured to continuously communicate with a second wireless device through a second NFMI signal interface, the first wireless device is configured to detect an error in the data set received from the third wireless device, in response to detecting the error, configure the first NFMI signal interface to receive the complete data set over an NFMI channel from the second wireless device through the second NFMI signal interface, and configure the NFMI channel to stream the complete data set to both the first wireless device and the second wireless device, wherein the complete data set includes both mono-audio and microphone data.

2. The apparatus of claim 1, wherein the first wireless signal interface is a primary interface for receiving the complete data set and the first NFMI signal interface is a backup interface for receiving the complete data set.

3. The apparatus of claim 1, wherein the first wireless device is configured to not receive the complete data set from the second wireless device until the first wireless device requests transfer of the complete data set.

4. The apparatus of claim 3, wherein the transfer request includes at least one of a switch roles of the first and second wireless devices request or a set-up a new wireless connection with the third wireless device request.

5. The apparatus of claim 1, wherein the second wireless device is configured to receive the complete data set from the third wireless device through a second wireless signal interface.

6. The apparatus of claim 1, wherein the wireless signal interface includes at least one of a Bluetooth Classic wireless interface or a Bluetooth Low Energy wireless interface.

7. The apparatus of claim 1, wherein the NFMI based robustness includes at least one of providing an alternate data set path, a network reconfiguration, network switching, signal retransmission, or signal diversity.

8. The apparatus of claim 1, wherein the data set further comprises at least one of media data, video playback data, audio playback data, sensor data, health status data, battery status, or device settings.

9. The apparatus of claim 1, wherein the error is at least one of an error caused by body shadowing, the data set is no longer being received, the data set is degraded, the data set has a signal strength below a threshold value, the data set contains digital or analog errors, a corrupted data set error, an incomplete data set error, or an erratic data set error.

10. The apparatus of claim 1, wherein the first and second wireless devices are hearables and the third wireless device is at least one of a smartphone or a wearable.

11. The apparatus of claim 1, wherein the wireless devices include at least one of a microphone; an earbud, a hearable, a smartphone, a smartwatch, a wearable device, a tablet, or a computer.

12. An article of manufacture including at least one non-transitory, tangible machine-readable storage medium containing executable machine instructions for robustness, wherein the article includes a first wireless device including a first wireless signal interface and a first Near-Field Magnetic Induction (NFMI) signal interface and a second wireless device including a second wireless signal interface, and a second NFMI signal interface, comprising:
    instructions for configuring the first wireless signal interface to receive a complete data set from a third wireless device;
    instructions for configuring the first NFMI signal interface to communicate continuously with the second wireless device through the second NFMI signal interface;
    instructions for configuring the first wireless signal to detect an error in the complete data set received from the third wireless device and, in response to detecting the error, request that the second wireless device send the complete data set over an NFMI channel to the first NFMI signal interface from the second NFMI signal interface; and
    instructions for streaming the complete data set to both the first wireless device and the second wireless device over the NFMI channel, wherein the complete data set includes both mono-audio and microphone data.

13. A method for NFMI based robustness, comprising:
    receiving a complete data set at a first wireless device from a third wireless device through a wireless channel;
    communicating continuously between the first wireless device and a second wireless device through an NFMI channel;
    detecting an error in the complete data set that the first wireless device received from the third wireless device;
    requesting that the second wireless device send the complete data set to the first wireless device over the NFMI channel in response to detecting the error; and
    streaming the complete data set to both the first wireless device and the second wireless device over the NFMI channel, wherein the complete data set includes both mono-audio and microphone data.

* * * * *